W. J. MINGLE.
INDEX FINGER FOR PRICE SCALES.
APPLICATION FILED JUNE 13, 1910.
1,237,365.
Patented Aug. 21, 1917.
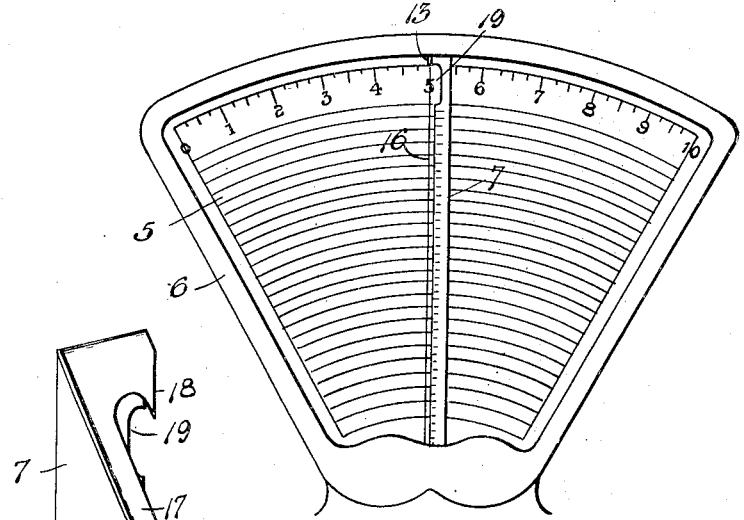
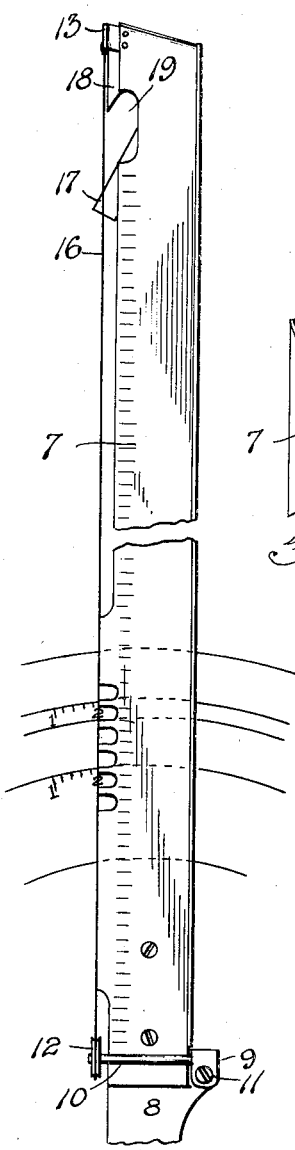
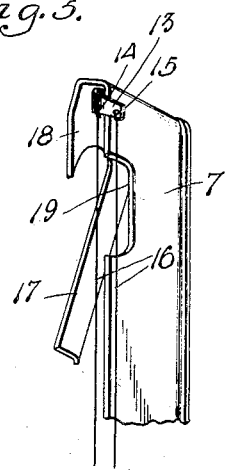
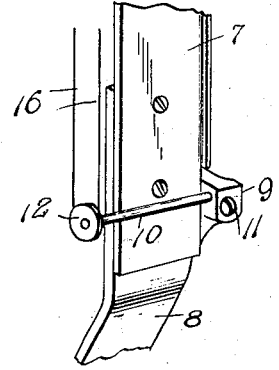
WITNESSES
G. M. Spring.
W. E. Finch
INVENTOR
Wm. J. Mingle
Attorney
Wm. J. Mingle

UNITED STATES PATENT OFFICE.

WILLIAM J. MINGLE, OF LANCASTER, PENNSYLVANIA, ASSIGNOR, BY MESNE ASSIGN-MENTS, TO TOLEDO SCALE COMPANY, OF TOLEDO, OHIO, A CORPORATION OF NEW JERSEY.

INDEX-FINGER FOR PRICE-SCALES.

1,237,365.            Specification of Letters Patent.      Patented Aug. 21, 1917.

Application filed June 13, 1910. Serial No. 566,566.

*To all whom it may concern:*

Be it known that I, WILLIAM J. MINGLE, a citizen of the United States of America, residing at Lancaster, in the county of Lancaster and State of Pennsylvania, have invented certain new and useful Improvements in Index-Fingers for Price-Scales, of which the following is a specification.

This invention relates to computing weighing scales and more particularly to the computing mechanism thereof which, in devices of this character, comprises a chart having computations thereon and an indicator movable with relation thereto. The particular form of chart in connection with which I have shown my invention is fan shaped and my invention consists in a novel form of indicating finger which is operated radially by the beam of the scales. It is customary to provide the indicator fingers of such scales with a single wire as a reading line. This wire is necessarily spaced a considerable distance from the chart to avoid contact therewith and if the chart is read at an angle as it is apt to be instead of from directly in front of the indicator finger the wire appears superposed upon computations to one side or the other of the correct reading with a consequent erroneous result. It is the object, among others, of my invention to obviate this difficulty and to insure a correct reading of the scale. Further objects of my invention will appear from the following detail description.

In the accompanying drawings I have illustrated specific forms of indicator fingers embodying my invention and have described the same in detail hereinafter for the purpose of fully disclosing my invention in an operative form but it will be understood that I am not limited to either of these forms but in the claims following the detail description I have stated the scope of my invention and my invention extends to all forms of devices coming within the terms of these claims and equivalent thereof.

Referring now to the drawings in which like characters of reference indicate corresponding parts, in the several views, Figure 1 is a front elevation of a chart showing one form of my improved indicator finger applied thereto; Fig. 2 is a view of a modification; Figs. 3, 4 and 5 are details showing features common to both modifications. The chart 5 is shown as of a common fan-shaped type mounted in a frame 6 and bearing weight indications at the top and a series of concentric curved lines for computations arranged below the series of weight numerals. The finger 7 is composed of a flat strip of metal or equivalent material secured to an arm 8 which may be operated from any approved form of weighing scale in any well-known or suitable manner. The features so far described are common in the art and my invention, which is applied thereto, will now be described.

The chart 5 terminates at its upper end short of the frame in a circumference concentric with the pivot of the pendulum and the latter is bent over the edge of the scale and extends downward upon the opposite side parallel to the face of the scale and the body of the finger (see especially Figs. 3 and 5). As usual in scales of this character the rear face of the chart also bears along the upper edge a series of numerals representing successively increasing weights which are to be read by the customer while the seller reads the computing face of the chart. At its upper end the finger 7 carries a lug 13 rigid with the finger and bent outwardly substantially perpendicular to the plane of the finger and perforated at spaced points as 14—15 for the reception of the ends of a double indicating wire which is otherwise mounted as hereinafter explained. Upon the upper end of the arm 8 and adjacent the lower end of the finger 7 is formed a lug 9 which is perforated for the reception of a shaft or spindle 10 upon which is rotatably mounted a small pulley 12. The shaft 10 may be adjusted longitudinally in the lug 9 to bring the pulley 12 into a plane parallel with the edge of the finger 7 and extending through the outer end of the lug 13, and the reading wire 16 is looped about the pulley 12 and secured at its ends in the holes or eyes formed in the lug 13 for this purpose. It will be noted that the lug 9 is at the opposite edge of the finger 7 from the pulley 12 so that the shaft 10 is of appreciable length to provide a spring tension upon the wire which is drawn taut before it is finally secured. The shaft or spindle 10 is fastened in adjusted position by a set screw 11. It will be obvious from this description of the construction that a suitable spring tension may be applied to the wires and will be evenly distributed between both strands thereof. As shown in Fig. 1 the wire is spaced apart from but parallel with the edge of the finger but if desired the wire may be in substantial contact with the edge of the finger or in the same plane therewith perpendicular to the face of the finger, but in that event the edge of the finger must be recessed as shown at 19, Fig. 2, in order that the computation characters on the chart may be read. As heretofore stated the upper end of the finger is bent parallel to the body thereof and extends upon the rear face of the chart. The bend is not at right angles to the edge of the finger but is upon an incline which throws the reversed end beyond the edge of the body of the finger. The projecting portion is slabbed off parallel to the edge of the main body and substantially in a line with the wire upon the front side of the finger and is cut back at 21 as shown more particularly in Fig. 5 to form a pointer 18 to indicate the weight upon the customer's side of the chart. The end of the reversed portion of the finger extends in a prolonged strip 17 to partially inclose a weight indication on the customer's side of the chart though this feature is immaterial. The weight numerals upon the face of the chart being larger than the computations the finger is cut away as at 19 to prevent obstructing the full view thereof.

I have described my invention in connection with a fan-shaped scale having indicator fingers movable thereof. It will be apparent however that other form of chart may be used and the chart may be movable over the indicator which is common in devices of this character.

I claim—

1. In a price scale, an index finger, a chart with relation to which the index finger is movable, two strands of material lying parallel and in a plane at right angles to the surface of the chart, and means for maintaining the strands under like tension.

2. In a price scale, an index finger having a plurality of strands of material parallel and at an angle to a surface over which the index finger moves, and means for equalizing the tension of the strands.

3. In a price scale, an index finger, a shaft extending transversely thereof, means for anchoring one end of the shaft, a pulley on the shaft, material looped around the pulley and having the strands thereof in a plane substantially at right angles to the plane of movement of the finger, and means on the finger to which the ends of the material are secured.

4. In a price scale, an index finger having a recess in its edge near the outer end having its outer end lying parallel to the recessed portion and said outer end having a recess in its edge, a shaft mounted transversely of the finger, means for anchoring one end of the shaft, a pulley on the shaft, material looped around the pulley and having its strands in a plane substantially perpendicular to the plane of movement of the finger to which the ends of the material are secured.

5. In a price scale, an index finger having a plurality of strands of material parallel to each other and to the edge of the finger but at a substantial angle to the surface over which the index finger moves, a shaft mounted transversely of the finger, means for anchoring one end of the shaft, a pulley on the shaft around which the material is looped and means on the finger to which the ends of the material are secured.

6. In a price scale, an index finger, a pair of strands of wire under tension mounted parallel to each other and in a plane at a substantial angle to the plane of movement of the finger.

7. In a price scale, an index finger, a pair of strands of wire mounted parallel to each other and in a plane at a substantial angle to the plane of movement of the finger, and means for equalizing the tension between the strands of wire.

8. In a computing scale, an index finger, a wire having both ends secured near one end of the index finger and a support at the other end of the finger, said wire being looped around said support and lying in a plane at a substantial angle to the plane of movement of the finger.

9. In a computing scale, an index finger, a wire secured at both ends to one end of the finger, a pulley near the other end of the finger around which the wire extends the strands of the wire lying in a plane at a substantial angle to the plane of movement of the finger.

10. In a computing scale, an index finger having a wire secured at one end thereto and resilient means secured to the other end of the finger and to which the wire is attached.

11. In a scale, an index finger, a reading wire having both ends connected to one end of the finger, a resilient support at the other end of the finger around which the wire is looped.

12. In a scale, an index finger, a reading wire secured at both ends to one end of the finger, a pulley resiliently mounted at the other end of the finger around which pulley the wire is looped.

13. In a computing scale, a finger having a wire 16 secured at both ends to a lug 13 at one end of the finger, a pulley 12 at the other end of the finger around which the wire is looped and which is mounted upon a resilient shaft 10 mounted at its opposite end in a lug 9; substantially as described.

14. In a computing scale, an index finger consisting of a metal strip 7 having a reading wire 16 arranged parallel to one edge thereof, the strip being bent upon an incline and cut away substantially as shown to form the pointer 18 substantially in the transverse plane of the wire.

15. In a scale, a chart and an index finger comprising a rigid supporting member and a flexible member stretched thereon and presenting a pair of straight edges spaced apart and arranged in a plane transverse to the plane of the chart.

16. In a price scale, a chart and a reading index having movement relative to each other, the index comprising a pair of strands of thin flexible wire maintained in a straight line by tension, such strands being parallel to each other and located in the same plane transverse to the direction of relative movement of the index and chart.

17. In a price scale, a chart and a reading index, said chart and index having relative movement, the index comprising a pair of strands of thin flexible wire connected and mounted parallel to each other in a plane transverse to the plane of relative movement, and means for exerting a tension on the wires.

18. In a price scale, a chart and an index movable relatively to each other, the index comprising a pair of strands of wire mounted parallel to each other and in a plane at a substantial angle to the direction of relative movement, means for exerting a tension on the wire and equalizing said tension between the strands thereof.

19. In a weighing scale, a chart and a reading index having movement relative to each other, the index comprising a pair of strands of thin, flexible material spaced apart and secured at the opposite ends of the index, such strands being arranged parallel to each other and located in the same plane at a substantial angle to the plane of relative movement.

In testimony whereof, I hereunto affix my signature in the presence of two witnesses.

WILLIAM J. MINGLE.

Witnesses:
ADAM DELLET,
WM. H. DORWART.